United States Patent [19]
Brownstein

[11] 3,990,676
[45] Nov. 9, 1976

[54] GASKET AND VALVE CONSTRUCTION

[76] Inventor: Raymond G. Brownstein, P.O. Box 143, Wexford, Pa. 15090

[22] Filed: Nov. 15, 1974

[21] Appl. No.: 524,243

[52] U.S. Cl. .............................. 251/175; 251/192; 251/195; 251/357
[51] Int. Cl.² ........................................ F16K 25/00
[58] Field of Search .......... 251/175, 357, 192, 195; 137/516.25; 277/207 R, 209; 49/484, 485

[56] References Cited
UNITED STATES PATENTS

| 612,394 | 10/1898 | Bernardi | 277/207 |
|---|---|---|---|
| 1,880,700 | 10/1932 | Beynon | 49/485 X |
| 2,505,270 | 4/1950 | Allen | 251/175 |
| 2,683,464 | 7/1954 | St. Clair | 251/175 UX |
| 2,844,353 | 7/1958 | Gurries | 251/175 |
| 2,852,226 | 9/1958 | Wheatley | 251/175 |
| 3,010,477 | 11/1961 | Graham | 127/516.25 |
| 3,327,429 | 6/1967 | Slaughter | 49/485 |
| 3,761,347 | 9/1973 | Yackiw | 49/484 X |

Primary Examiner—Harold W. Weakley
Attorney, Agent, or Firm—Parmelee, Miller, Welsh & Kratz

[57] ABSTRACT

A resilient sealing gasket of patch-like shape having a ring-like sealing lip that defines a continuous pressure chamber open to receive positive fluid flow, is mounted in a shape-conforming positioning on a valve control body that is adapted to be moved, slid or rotated into and out of a fluid flow closing-off position within a valve housing. The sealing portion of the gasket is cross connected along its central area, and the valve housing defines a fluid passageway therein that is serviced by inlet and outlet ports. A second sealing lip is also shown that is sensitive to positive fluid pressure applied in a direction opposite to fluid pressure applied to the first-mentioned sealing lip.

3 Claims, 11 Drawing Figures

U.S. Patent  Nov. 9, 1976  3,990,676
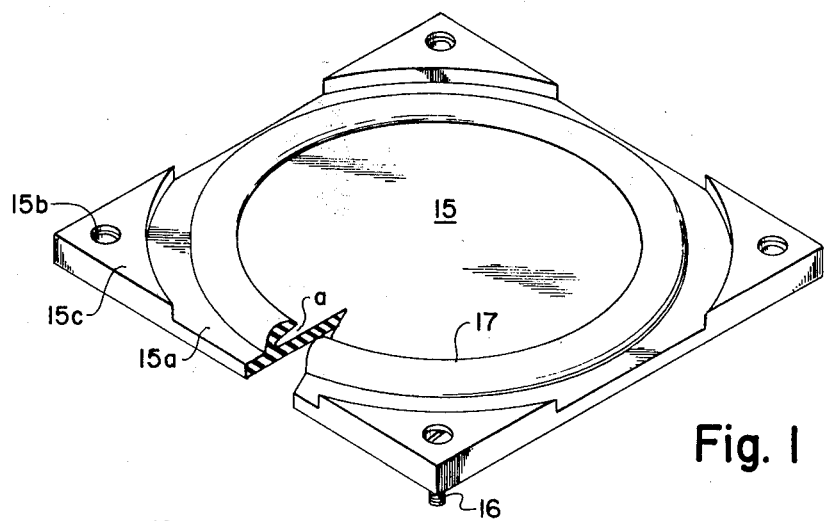
Fig. 1
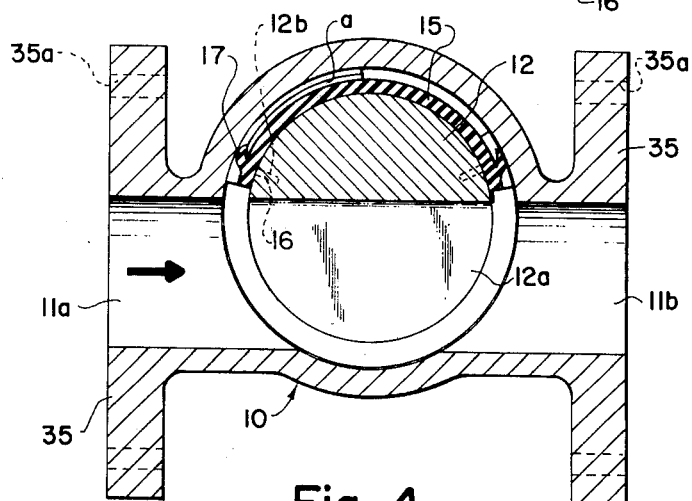
Fig. 4
Fig. 2
Fig. 3
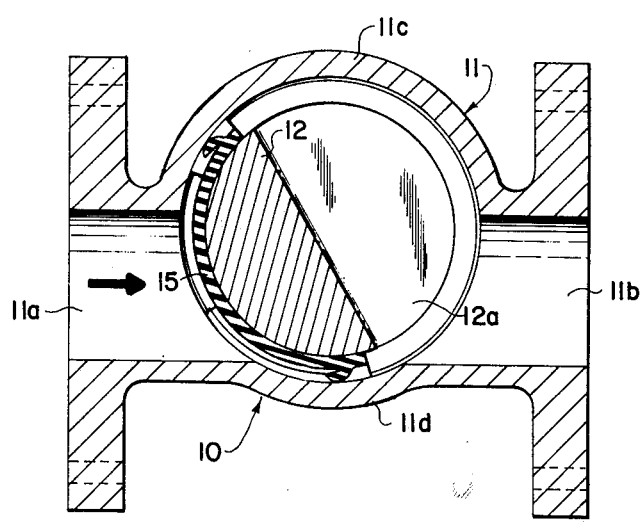
Fig. 5
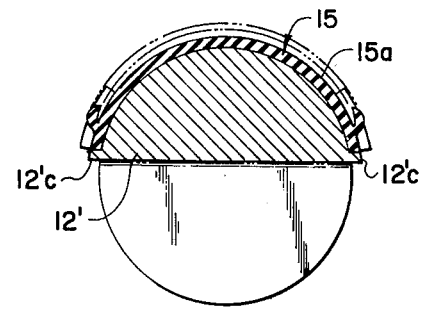
Fig. 6

GASKET AND VALVE CONSTRUCTION

BACKGROUND OF THE INVENTION

1. Field of the Invention

This invention relates to improved valve constructions and particularly, to a sealing gasket that has so-called beam strength as utilized in a valve construction. One phase of the invention deals with a sealing element for fluid control usage that will have an improved resistance to position displacement and that will simplify valve construction and operation. Another phase relates to improved valve constructions for utilizing a resilient gasket constructed in accordance with the invention.

2. Description of the Prior Art

Heretofore, it has been customary in rotary and other valve applications to utilize so-called resilient O-ring gaskets. A so-called slot type of valve utilizes such a ring gasket in an inset position about a segment of its hemispherical or circular shape for sealing-off direct flow between inlet and outlet portions of a housing by, for example, rotating a back-up or control body which supports the gasket. There is a tendency for fluid pressure, and particularly higher fluid pressures, to elongate the gasket, since the material is relatively incompressible, and to thus force a portion of the gasket out of its seating groove or slot. In such a free sealing O-ring type of utilization, pressure elongation of the gasket causes it to bulge into the port area to not only effect a poor sealing operation, but primarily, to expose a portion of the ring such that it will be damaged in the rotation of the valve body, as by tearing. The replacement of the gasket then becomes essential. I have found that in this type of installation the difficulty arises from the fact that the gasket does not have beam strength sufficient to resist deformation and stay in position in its sealing groove.

SUMMARY OF THE INVENTION

It has been an object of the present invention to evaluate the factors involved that give rise to extensive wear and tear on so-called standard types of O-ring gaskets in their utilization, and to devise a solution to the problem which is thus presented;

Another object of the invention has been to develop a new and improved form of sealing gasket which may be termed a patch gasket, and one whose body will provide requisite beam strength for full operating position retention during its utilization and under high as well as low fluid pressure applications;

Another object of the invention has been to develop a gasket having a circular sealing action whose circular sealing portion or portions will be fully supported in their proper operating positions when utilized in a mounted relation on or with respect to a movable closing and opening valve body part;

A further object of the invention has been to devise an operating gasket that will have a practical application to various types of utilizations and that will enable a relatively inexpensive, simplified type of valve construction, particularly such that a rotary cylinder valve will have a new field of utilization and will make it a practical substitute of, for example, a gate valve.

These and other objects of the invention will appear to those skilled in the art from the illustrated embodiments and the claims.

BRIEF DESCRIPTION OF THE DRAWINGS

FIG. 1 is a top perspective view of a patch-like type of gasket construction of the invention that may be utilized either in a planar form for a gate valve or that may be utilized in a semi-circular or semi-spherical form for use with so-called rotating cylinder, reciprocating or slide cylinder types of valves;

FIG. 2 is an enlarged fragmental section through the gasket of FIG. 1, particularly illustrating the construction of its ring-like sealing lip and the relation of its main body with respect thereto;

FIG. 3 is a fragmental section on the same scale as FIG. 2, illustrating a modified form of gasket construction of the invention which is effective for sealing-off fluid flow as applied from either or both upstream and downstream ends within an operating chamber or passage of a valve housing;

FIG. 4 is an end or transverse section in elevation taken along the line IV—IV of FIG. 7, illustrating a cylindrical type of rotating valve construction of the invention that utilizes a patch-like gasket of the invention in an outwardly presented convexly curved positioning on its cylindrical rotative control or operating body; in this figure the rotative body is in its fully open, fluid passing position;

FIG. 5 is an end view similar to and on the scale of FIG. 4, particularly illustrating the rotative control or operating body for the valve in a closed position from the standpoint of its inlet, upstream port or passageway;

FIG. 6 is a fragmental end section on the scale of FIGS. 4 and 5, showing a control or operating body of a slightly modified construction which has a rim thereabout for retaining the gasket thereon;

DESCRIPTION OF THE PREFERRED EMBODIMENT

Figure 8:
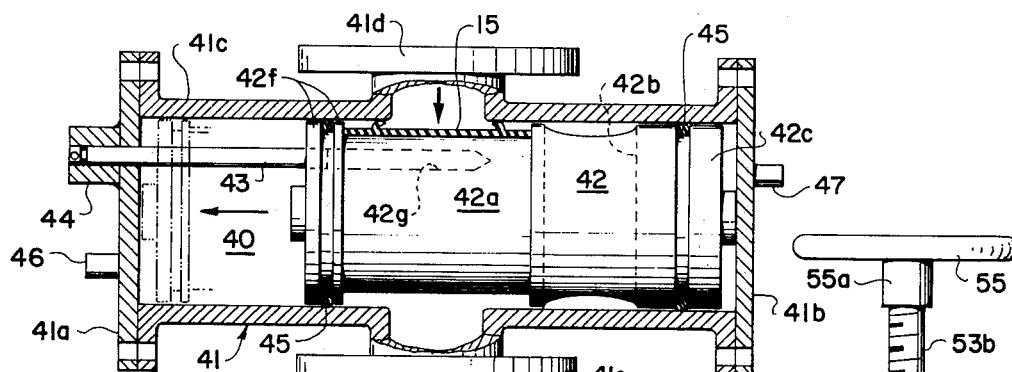
FIG. 8 is a side sectional view in elevation on the scale of FIG. 7, showing a fluid-operated, reciprocating type of valve body utilizing a gasket of the invention.
Figures 9, 10, 10A:
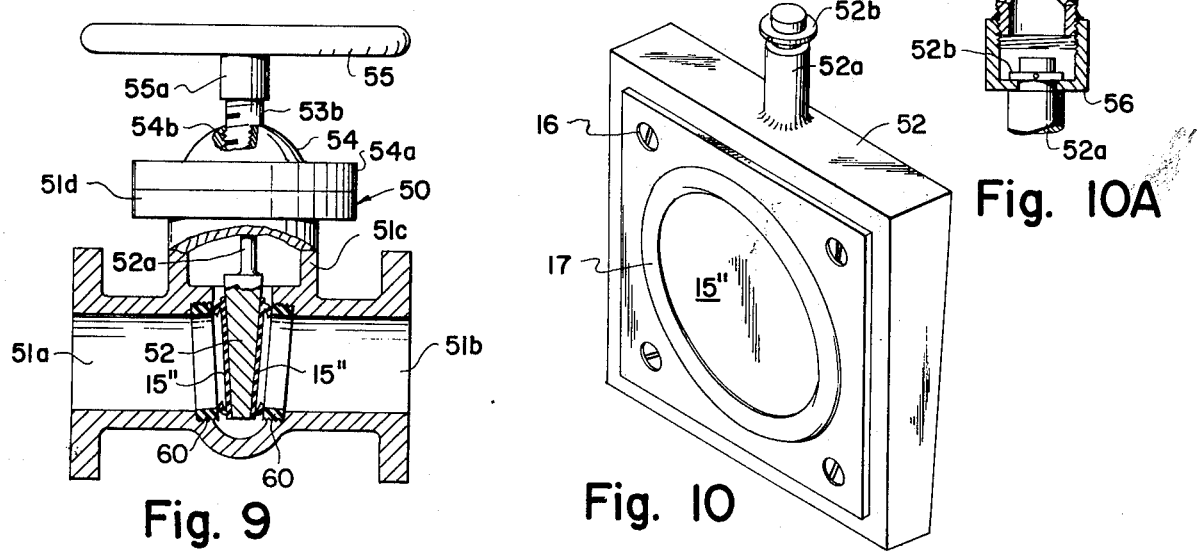
FIG. 9 is a side view in elevation and partial section illustrating a gate valve construction utilizing a pair of planar-positioned gaskets of the invention.
FIG. 10 is a greatly enlarged end perspective view in elevation showing the gate part of the construction of FIG. 9 with a gasket of the invention in a mounted positioning thereon.
FIG. 10A is a fragmental view in elevation and partial section showing details of the valve construction of FIG. 9.

In carrying out the invention and as particularly illustrated in FIGS. 1, 2 and 3, a sealing gasket 15 of a material suitable for sealing usage, such, for example, as natural rubber, or a suitable resilient resin such as Teflon, may be formed into a patch-like shape, such as shown in FIG. 1, for direct application to a planar valve closure member 52 (see FIGS. 9 and 10). It may also be shaped into a semi-cylindrical contour or segment for use with valve constructions such as illustrated in FIGS. 4, 5, 6, 7 and 8, by heating it to around 400° F. in a mold and permitting it to set in curved shape such that it will conform to and may be mounted on a curved, cylindrical or circular valve body. Contrary to conventional gasket constructions for closing-off a relatively large sealing lip diameter, patch-like gasket element 15 has its active sealing rim or ring 17 provided with a continuous, annular, chamber-defining lip projection 17b on an outer side 15a of a closed-off, cross-connected central body area. Such body defines a beam-like supporting, closed area across inner boundaries of the active sealing surface adjacent surmounting, continuous sealing rim 17 thereof, and is constructed to assure a beam-like overall support of the sealing lip area.

In the gasket 15 illustrated in FIGS. 1 and 2, the body is of patch-like construction and is shown of substantially uniform thickness along its full extent, except at corners 15c which are reinforced and, of course, at the sealing rim or ring 17 which extends continuously thereabout. The gasket 15 may be and is preferably mounted on a control, operating part or body such as cylindrical-like segment 12 of a typical valve unit 10 by means of pins or threaded set screws 16 (see also FIG. 4) which extend into threaded holes 12b within the body. As particularly shown in FIG. 2 and as emphasized by the closed position of FIG. 5, the rim 17 will have its connecting neck portion 17a facing downstream of a valve port or passageway within which fluid under positive pressure is present and will have the forward edge of its immediate opening-defining lip 17b facing the port or passageway, such that its chamber portion a will receive the pressure fluid to act on the lip 17b to expand and hold it in a sealing relation with the wall of a housing 11, when, for example, as shown in FIG. 5, inner valve control or operating body 12 is turned or rotated with its gasket 15 facing upstream of an inlet port or passageway 11a. The inner central area of the gasket 15 is the bridging area and the outer circumferential area is the sealing area. As shown, the lip 17b terminates forwardly in a convexly sloped or hooded edge and has a greater thickness than the neck 17a adjacent thereto.

Where the valve 10 is to be used for shutting-off flow of fluid under pressure from either a downstream port or passageway 11b or from an upstream port or passageway 11a or from both, the type of gasket 15' shown in FIG. 3 may be used. Using such a gasket, it will be noted that two adjacent rims 17 and 17' are positioned to project or face in opposite directions from the upper, outer face or side 15'a of the wall of the main body. Thus, if the valve body 12 of FIG. 5, for example, is to be turned counterclockwise from the position of FIG. 4 to close-off inlet portion 11a, the rim 17 becomes effective. On the other hand, if the valve control body 12 is turned clockwise to a position opposite to that shown in FIG. 5 to close-off the downstream, outlet port or passage portion 11b, then the rim 17' becomes effective. By facing the rims 17 and 17' in the same direction (not shown) a dual sealing action may be obtained for one direction of fluid application.

Figure 7:
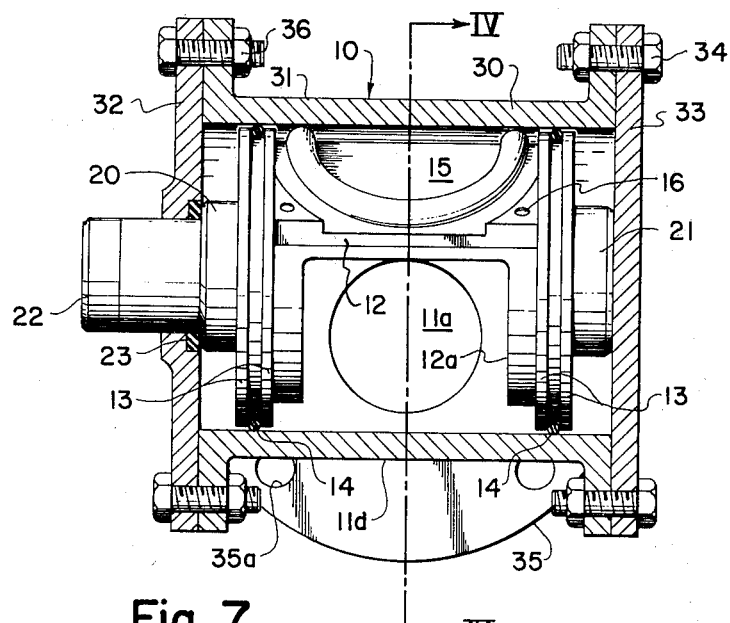
FIG. 7 is a side view in elevation on the scale of and showing the valve unit of FIGS. 4 and 5.

FIGS. 4, 5 and 7 show a rotating cylindrical type of valve unit 10 which is mounted within a housing 30 that has a cylindrical side wall 31 and a pair of planar end walls 32 and 33 that are removably secured together by bolt and nut assemblies 34, 36. The housing 30, also has a pair of passageway defining, flanged, side portions 35 that are adapted to be bolted at 35a to suitable conduit members (not shown). The side wall 31 provides an operating surface for rotatable control body 12. The control body 12 has a cross-extending chamber or passageway defining open portion (see FIGS. 4 and 7) that is adapted to be rotated into and out of alignment with the port or passageway portions 11a and 11b in the housing 30. The body 20 has a solid cylindrical wall portion which serves as a convex receiving or mounting surface for the valve gasket 15.

In FIG. 6, a modified form of control or operating body 12' is shown provided with an encircling, outwardly projecting mounting rim 12'c which enables the gasket 15 to be retained in position thereon without the use of means such as the set screws 16. However, if desired, the set screws 16 may be also used with the mounting of FIG. 6. It will be noted that the outward edge of the rim 12'c extends only for approximately the thickness of the wall 15a of the gasket 15.

As shown in FIG. 7, the central or operating body 30 of cylindrical shape has positioning shoulders 20 and 21 at its opposite ends for retaining it in an operative mounting for rotative movement within housing wall 31, as effected by a hand wheel or other operating means (not shown) that is secured or mounted on an outwardly extending shaft portion 22 that projects outwardly from the shoulder 20. The shaft portion 22 is sealed in its rotative positioning within front plate member 32 by an annular wiper gasket 23.

Although the gasket 15 when rotated by the body 12 to a closing-off abutment across one port portion 11a (see FIG. 5), will shut-off fluid flow from it to a downstream or outlet port portion 11b, supplemental sealing means 14 is shown provided at each end of the operating body (see FIG. 7). Pairs of end-positioned, groove-defining rim portions 13 serve as retention mounts for associated O-ring gaskets 14. The gaskets 14 thus serve as resilient piston ring bearings for the rotative operation of the valve body 20 and also serve to prevent leakage of fluid from the main operating chamber into end reaches of the housing 30.

In the valve unit 40 of FIG. 8, an operating piston 42 is carried within cylindrical side wall 41 of its housing for back and forth or reciprocating opening and closing movement with respect to a pair of oppositely positioned, inlet and outlet port or passageway portions 41d and 41e. The cylindrical side wall 41 of the housing is closed-off by end walls 41a and 41b which may be secured in place in the usual manner, as by nut and bolt assemblies. Piston-like operating or control body 42, like the control body 12 of the embodiment of FIG. 7, carries a pair of O-ring gaskets 45 adjacent each end thereof to provide a piston ring like type of sealing mounting for its back and forth movement. The circular groove portion for mounting one gasket 45 is shown formed in the diameter of cylindrical end portion 42c of the body 42, and the groove portion for receiving the other gasket 45 is provided by a pair of ring projections 42f at the other end portion of the body 42.

The full line position shown in FIG. 8 represents a position at which a gasket 15 of the invention is in a sealing-off relation with respect to inlet, upstream port or passageway portion 41d. When the body 42 is moved to the left to the dot and dash position shown, then fluid is permitted to pass between inlet and outlet portions 41d and 41e, across a centrally concave, circular, outer side wall portion 42b of the body. The wall portion 42b which is adjacent to gasket-carrying portion 42a, terminates in fully cylindrical back end portion 42c. The body part 42 has a forwardly open, cylindrical end bore 42g therein which is adapted to slidably receive a guide rod or pin 43 that projects from the front end closure wall or plate 41a, and terminates within an end mounting block 44. In this construction, the body 42 may be reciprocated back and forth on the pin 43 by means of positive fluid pressure alternately applied to the front and rear end portions of the housing through hose connector fittings 46 and 47.

In the gate valve construction 50 shown in FIGS. 9 10 and 10A, gaskets 15" of flat or planar construction are applied to opposite sides of a somewhat wedge-shaped, plate-like, control body part 52. The valve unit 50 is provided with a cylindrical housing 51 having an inlet port or passage portion 51a and an outlet port or passage portion 51b. The central portion of the housing is fitted with a pair of seat-defining sealing collars or rings 60 that are threadably mounted therein and whose inner edges serve as sealing or abutment edges for the sealing rim 17 of a gasket 15".

The housing 51 has a centrally disposed lower bonnet half or portion 51c and a mounting flange 51d that cooperates with a mounting flange 54a of an upper bonnet half or part 54. The two flanges 51d and 54a may be removably secured together in the conventional manner by a flat sealing gasket and through-extending nut and bolt assemblies (not shown). The control body 52 is carried by a centrally mounted and upwardly extending operating shaft 52a whose upper end has an annular ring 52b secured thereon as by a pin. The ring 52b is adapted to rotatably retain the upper end of operating shaft 52a within a thread-mounted collar 56 that is positioned to extend downwardly from a lower end of an upper shaft 53. The shaft 53 may be turned by hand wheel 55 with respect to the shaft 52a for effecting a raising and lowering of the shaft 52a and thus, of the valve body 52. The shaft 53 has a reduced diameter diameter upper portion 53b that is vertically adjustably mounted within a threaded bore 54b (see FIG. 9) of the upper bonnet part 54. A hub portion 55a of a hand operating wheel 55 is secured on the uppermost end of the shaft 53. Opening up and down closing movement of the gate body 52 is accomplished by turning the hand wheel 55 to thus raise or lower the threaded shaft portion 53b within the threaded bore 54b.

Although cylindrical and gate types of valves have been chosen for the purpose of illustrating the invention, the gasket 15 may be formed into a spherical segment and used for mounting on the rotating body of a ball valve unit.

I claim:

1. In a valve for opening and closing-off fluid flow therethrough, an outer housing body having opposed fluid inlet and outlet passageway portions and a wall defining an operating chamber between said inlet and outlet portions, a control part operatively positioned within the operating chamber of said housing body, said control part having a wall portion for movement into and out of a closing-off position with respect to at least one of said opposed passageway portions, a patch-like sealing gasket having a pair of opposed wide side faces and at least one sealing rim projecting from one of said side faces and annularly about said gasket adjacent outer edges thereof, means mounting said gasket on said wall portion of said control part with its opposite side face in substantially full shape-conforming abutment therewith, said rim having a continuous sealing lip that defines a fluid-receiving chamber on said one side face that is sensitive to the pressure of fluid introduced within the valve and that has a fluid sealing relation with respect to the wall of said operating chamber when said wall portion of said control part is moved into a closing-off position, said gasket having a second and adjacent sealing rim of the defined construction of said first-mentioned rim, and the sealing lips of said rims facing in opposite directions with respect to each other, whereby their respective fluid-receiving chambers are sensitive to the pressure of fluid applied in opposite directions to said gasket.

2. A valve as defined in claim 1 wherein, said wall portion of said control part and the wall of said operating chamber have complementary rounded shapes, and said gasket has a complementary rounded shape with respect to said wall portion of said control part.

3. A valve as defined in claim 1 wherein said wall portion of said control part is of planar shape, and said gasket is of planar shape and is secured in an abutting relation on said wall portion.

* * * * *